Figure 1:
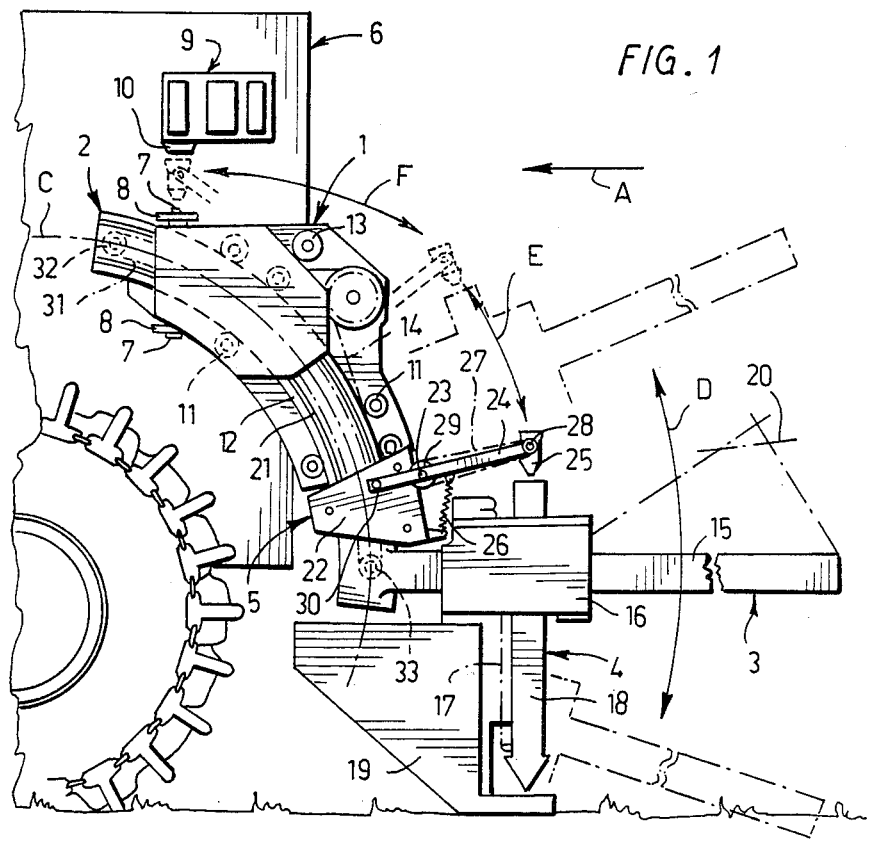

United States Patent [19]

Turunen

[11] Patent Number: 4,583,471
[45] Date of Patent: Apr. 22, 1986

[54] PLANTING DEVICE

[75] Inventor: Lasse Turunen, Mänttä, Finland

[73] Assignee: G A Serlachius Oy, Mänttä, Finland

[21] Appl. No.: 182,316

[22] Filed: Aug. 28, 1980

[30] Foreign Application Priority Data

Aug. 29, 1979 [FI] Finland ............... 792684

[51] Int. Cl.⁴ ............................................ A01C 11/00
[52] U.S. Cl. ...................................................... 111/2
[58] Field of Search ............... 111/2, 3, 34, 89, 91; 221/219

[56] References Cited

U.S. PATENT DOCUMENTS

| 111,217 | 1/1871 | Kent | 111/34 |
| 2,514,522 | 7/1950 | Shelton | 111/89 |

FOREIGN PATENT DOCUMENTS

| 170177 | 7/1951 | Austria | 111/3 |
| 52509 | 6/1977 | Finland | 111/2 |
| 761591 | 8/1977 | Finland | 111/2 |
| 53391 | 1/1978 | Finland | 111/2 |
| 781437 | 11/1978 | Finland | 111/2 |
| 792456 | 2/1981 | Finland | 111/2 |
| 802386 | 2/1981 | Finland | 111/2 |
| 255353 | 10/1927 | Italy | 111/3 |
| 290399 | 11/1931 | Italy | 111/3 |
| 7316167 | 8/1975 | Sweden | 111/2 |
| 264034 | 1/1971 | U.S.S.R. | 111/3 |
| 673221 | 7/1979 | U.S.S.R. | 111/34 |
| 704502 | 12/1979 | U.S.S.R. | 111/3 |

Primary Examiner—James R. Feyrer
Attorney, Agent, or Firm—Cushman, Darby & Cushman

[57] ABSTRACT

A planting device for planting of plants includes a frame to be mounted on a traction vehicle. A support arm, carrying a planting assembly, extends backwards in parallel with the direction of movement of the traction vehicle and is mounted by the frame for movement along a path extending upwardly and forwardly toward the vehicle from a lowered planting position to a raised position. This mounting arrangement permits the support arm and the planting assembly to rise to avoid obstacles in the ground.

15 Claims, 5 Drawing Figures

PLANTING DEVICE

The present invention relates to a planting device for planting of plants comprising a frame to be connected to a traction vehicle, a support arm carried by said frame and extending essentially parallel to the direction of movement of the traction vehicle, said support arm being vertically displaceably supported by the frame, and planting means supported by said support arm displaceably in the direction of movement of the traction vehicle.

Planting devices are previously known in which a vertically moveable planting means, which makes a planting hole in the ground and drops therein a plant to be set, is mounted on a support arm carried by a frame. This support arm is mounted in the frame by means of a fixed horizontal pin so that the support arm is pivotable in a vertical plane around said fixed horizontal pin by means of an actuator between a raised retracted position and a lowered planting position (Swedish Patent Specification No. 378,167 and Finnish Patent Specification No. 53,391). Due to such a link construction, the support arm can be held on a suitable level above the ground surface in relation to the planting means and, when necessary, be lifted upwards-backwards in a vertical plane to keep clear of any obstacles on the driving path of the vehicle.

However, such a support arm linked around a fixed horizontal pin suffers from the disadvantage that the planting means and the associated driving elements must be positioned relatively far away from the frame supported by the traction vehicle because a sufficient lifting height is obtained only farther away from the linked front end of the upwards-backwards pivoting support arm. The construction will be rather lax and harmfully swinging, and the planting means will not always follow the tracks of the traction vehicle with sufficient precision.

It is an object of the present invention to provide a planting device which eliminates the above-mentioned drawbacks and in which the support arm is mounted in the frame in a novel manner regarding their mutual movements. This object is reached by means of a planting device according to the invention which is characterized in that the support arm is mounted to be displaced at its front end in a vertical plane along a forwards-upwards inclined path from a lowered planting position to a raised retracted position.

The planting device according to the invention is based on the idea that the support arm is caused to move as an entire unit in a vertical plane along an inclined forwards-upwards extending path of movement and at the same time to maintain its angular position in relation to said path of movement. In this way a sufficient lifting height for avoiding obstacles on the ground can be obtained also when the planting means and its driving elements are located quite close to the front end of the support arm. The planting means including its driving elements can thus be mounted as close as possible to the frame which is to be mounted on the traction vehicle, whereby a simple and sturdy construction is obtained. In addition, the planting means, during its retracting movement in the vertical plane, remains at the same distance from the inclined forwards-upwards. extending path of movement of the support arm so that the transfer of plants from a plant magazine to the planting means can be carried out in a simple and reliable manner in different elevations of the support arm.

Although the path of the forwards-upwards movement of the support arm in principle can be rectilinear, a curved path of movement is preferred because in this case an additional lifting movement is obtained for the support arm owing to the curvature of the path of movement.

The curved or rectilinear path of movement for the support arm according to the invention can be realized by means of a support boom of a corresponding shape, i.e. by means of a curved or straight boom. This support boom can be arranged displaceable in a vertical plane in relation to the rigid frame, whereby the support arm is at its front end rigidly fastened to the lower end of the support boom, or the support boom can be immovable in a vertical plane and the frame be arranged displaceable along the support boom, in which case the support arm is at its front end fastened to the frame immovably in a vertical plane with respect to said frame.

Figure 2:
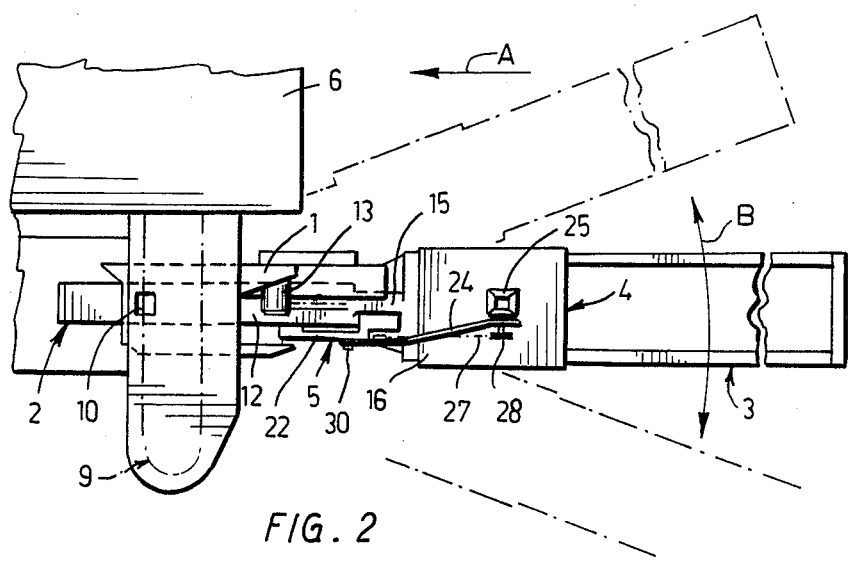
Figure 3:
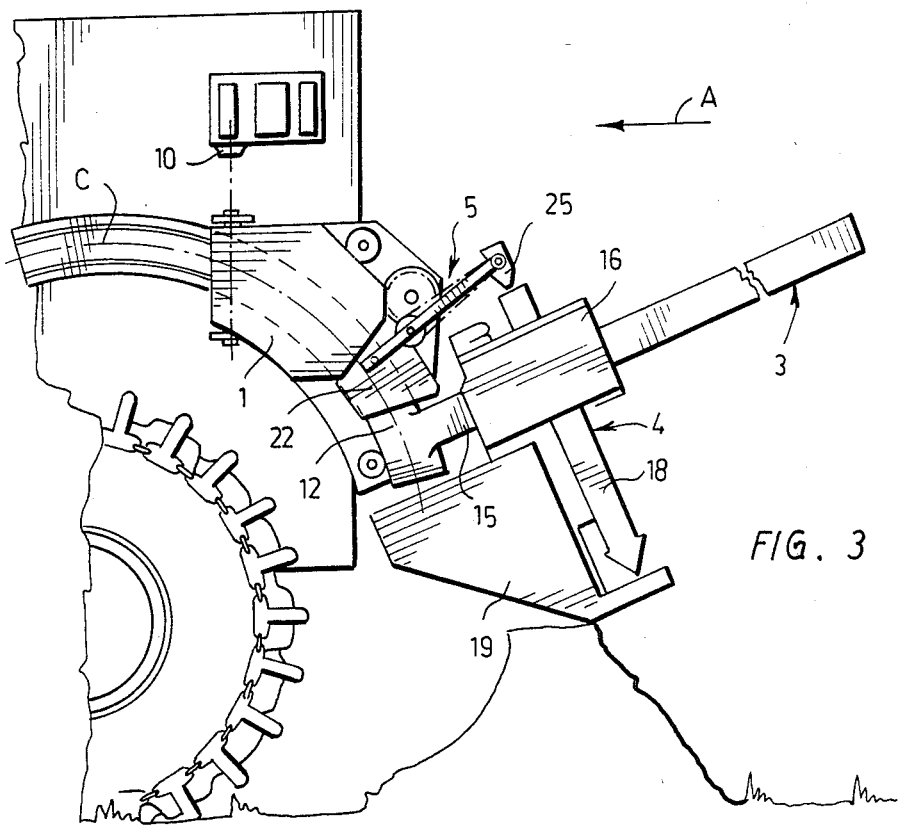
Figure 4:
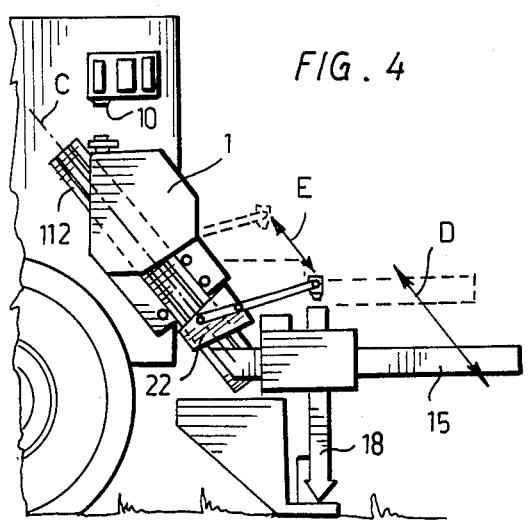
Figure 5:
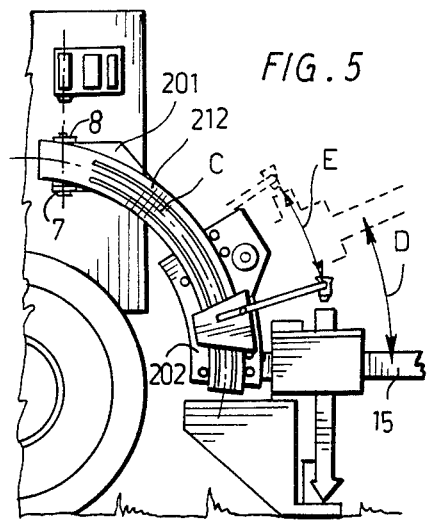

The invention will be described in more detail in the following with reference to the accompanying drawings, wherein FIG. 1 is a side view of a preferred embodiment of a planting device according to the invention and of the rear part of a traction vehicle, with the planting means located in planting position, FIG. 2 is a top view of the planting device, FIG. 3 is a similar view to FIG. 1 with the planting means located in retracted position, FIG. 4 is a schematic side view of a second embodiment of the planting device, and FIG. 5 is a schematic side view of a third embodiment of the planting device.

The planting device showin in FIGS. 1 to 3 of the drawing generally comprises a frame 1, a support boom 2, a support arm 3, and a planting means 4. The planting device is intended to be mounted on the rear part of a traction vehicle, such as a tractor or plant setting machine. The direction of movement of the traction vehicle is indicated by the reference A.

The case-like frame 1 is journalled by means of a pivot pin 7 between ears 8 supported by the traction vehicle so that the frame can restrictedly pivot in the manner indicated by the arrow B (FIG. 2) around the pivot pin 7. The ears 8 are arranged so that the pivot pin is located vertically below a delivery opening 10 of a plant magazine 9 mounted in the traction vehicle.

In the frame are mounted guide rollers 11 supporting and guiding a curved support boom 12 so that the support boom is displaceable in a vertical plane along an arc-shaped path of movement C coinciding with the longitudinal axis of the support boom, as indicated by the arrow D in FIG. 1. The support boom is displaced upwards and downwards by means of fluid motor 13 through a wire 14 fastened to the support boom for absorbing shocks applied to the planting device.

To the lower end of the support boom is rigidly fastened a rearwardly directed support arm 15 forming a guide for a carriage 16 moving along said arm. The carriage supports a vertical planting tube 18 displaceable upwards and downwards by means of a hydraulic cylinder 17 and a guiding paw 19 fixedly connected to the carriage. A hydraulic cylinder which returns the carriage from the rear end of the support arm to the front end thereof is indicated by the reference numeral 20.

To the outside of the curved support boom are fastened curved rails 21 which are parallel to the longitudinal axis of the support boom. A sledge 22 is mounted to move along said rails. An arm 24 is pivotally journalled by means of a shaft pin 23 to the sledge. The outer end of said arm pivotally support a plant cup 25. A spring 26 keeps the arm in the basic position shown in FIG. 1 in relation to the sledge. A link chain 27 extends around a chain wheel 28 fastened to the cup and around a chain wheel 29 fastened to the sledge. To the inner end of the arm is fastened a guide cam 30. The support boom is provided with a transfer chain 31 extending around a chain wheel 32 journalled in the upper end of the support boom and around a chain wheel journalled in the lower end and rotated by a fluid motor 33. The sledge is fastened to this chain. The sledge is displaced by means of the chain on the rails 21 along the longitudinal axis of the support boom, whereby the cup 25 in a corresponding manner moves along a path of movement C defined by a circular arc. At the upper end of the path of movement the guide cam of the arm 24 contacts a guide 25 fastened to the frame and forcing the arm to pivot in relation to the sledge so that the cup moves along a curved path of movement E to a position below the delivery opening 10 of the plant magazine. The chain 27 then pivots the cup into a vertical position.

As the vehicle advances and the guiding paw 19 follows unevennesses in the ground, the guiding paw raises or lowers the support arm 15 via the carriage 16, whereby the support boom rigidly fastened thereto in a corresponding manner moves upwards and downwards on the guide rollers 11. It will be noted that the guiding paw and the plant setting tube in this construction are able to move aside for a considerable distance in the vertical direction even if they are located right in the front end of the support arm.

The guiding paw and the planting tube form in a manner known per se a planting hole in the ground, drop a plant into the hole and compact the plant while the carriage stays immovable in relation to the ground and the carriage moves towards the rear end of the support arm due to the fact that the support arm is continuosly pulled forwards. Thereafter the hydraulic cylinder 20 returns the carriage to the initial position shown in FIG. 1. At the same time, the fluid motor 33 has moved the sledge 22 to the upper position in which the cup is located under the delivery opening 10 of the plant magazine and has received a plant to be set from said magazine, and has thereafter returned the sledge to the initial position shown in FIG. 1 in which the plant is dropped into the planting tube. It will be noted that the cup can be means of the shown construction in its upper receiving position always be positioned exactly below the delivery opening of the magazine and in its lower delivery position always exactly above the planting tube irrespective of the elevation of the support arm.

The alternative embodiment shown in FIG. 4 differs from the preceding one in that the support boom 112 is straight. Corresponding parts are indicated by the same reference numerals as in the preceding embodiment.

The alternative shown in FIG. 5 differs from the one shown in FIGS. 1 to 3 in that the curved support boom 212 is immovable in the vertical plane and is journalled at its upper end in ears 8 on the frame 201 and that the support arm 15 is rigidly fastened to the sledge 22 which, in turn, is mounted on the support boom for movement along its curved longitudinal axis. In this embodiment, the guide rollers 11 and the relieving means 13 are mounted in the sledge 202.

The embodiment shown in FIG. 5 can be modified in a manner similar to FIG. 4 by replacing the curved support boom 212 with a straight support boom.

The drawings and the related specification are only intended to illustrate the idea of the invention. In its details the device according to the invention may vary with the scope of the claims.

What I claim is:

1. Apparatus for planting plants comprising: a frame; means for connecting said frame to a traction vehicle; a support arm having a forward end portion adjacent said frame and extending away from said frame in a direction essentially parallel to the direction of movement of the traction vehicle; a ground-engageable planting assembly mounted on said support arm for displacement therealong; and mounting means mounting the forward end portion of said support arm on said frame for movement in a vertical plane along a forward and upward path from a lowered planting position to a raised position.

2. Apparatus as in claim 1 wherein said mounting means includes a support boom extending forwardly and upwardly in a vertical plane and guides for guiding said boom for movement along said forward and upward path, said forward end portion of said support arm being rigidly connected to said boom.

3. Apparatus as in claim 2 wherein said means for connecting said frame to a traction vehicle includes a vertical link which can be connected to the vehicle and which permits pivoting of said frame in a horizontal plane.

4. A planting device for planting of plants comprising a frame (1;201) to be connected to a traction vehicle (6), a support arm (15) carried by said frame and extending essentially parallel to the direction of movement (A) of the traction vehicle, said support arm being vertically displaceably supported by the frame, and planting means supported by said support arm displaceably in the direction of movement of the traction vehicle, characterized in that the support arm (15) is mounted to be displaced at its front end in relation to said frame (1;201) in a vertical plane along a forwards-upwards inclined path (C) from a lowered planting position to a raised retracted position.

5. A planting device as claimed in claim 4, characterized in that said support arm (15) is at its front end mounted on a support boom (12;112;212) extending forwards-upwards in a vertical plane.

6. A planting device as claimed in claim 5, characterized in that the support boom (12;212) is curved.

7. A planting device as claimed in claim 5, characterized in that the support boom (112) is straight.

8. A planting device as claimed in claim 5, characterized in that said support boom (12;112) is at its upper end mounted in the frame (1) to move in relation to the frame along the longitudinal axis (C) of the support boom, and in that the support arm (15) is rigidly fixed to the lower end of the support boom.

9. A planting device as claimed in claim 8, characterized in that the frame (1) is provided with guide rollers (11) on which the support boom (12;112) moves in relation to the frame.

10. A planting device as claimed in claim 8 or 9, characterized in that the frame (1) is provided with a vertical link (7) which can be fastened to the traction vehicle (6) and which permits pivoting of the frame in a horizontal plane (B) in relation to the traction vehicle.

11. A planting device as claimed in claim 10, characterized in that the axis of the vertical link (7) passes through an upper fixed plant delivery means (10).

12. A planting device as claimed in claim 5, characterized in that said support boom (212) is at its upper end fastened to the frame (201) immovably in a vertical plane, and in that the support arm (15) is at its front end mounted on the support boom (212) for movement along the longitudinal axis (C) of the support boom.

13. A planting device as claimed in claim 12, characterized in that said support arm (15) forms a fixed angle with the longitudinal axis (C) of the support boom (212).

14. A planting device as claimed in claim 12 or 13, characterized in that the support boom (212) is mounted in the frame (201) by means of a vertical link (7) permitting pivoting of the support boom in a horizontal plane in relation to the frame.

15. A planting device as in claim 8 including a fixed plant delivery means located above said vertical link, the axis of said link passing through said plant delivery means.

* * * * *